March 3, 1964  S. S. ROMAN  3,123,661
RETRACTABLE MIRROR FOR A LIPSTICK TUBE
Original Filed Nov. 28, 1958
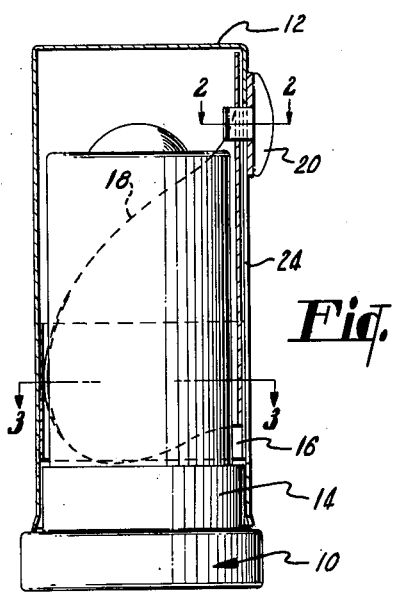
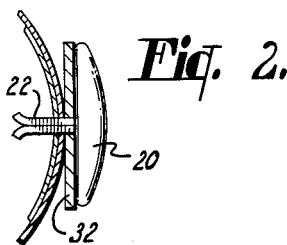
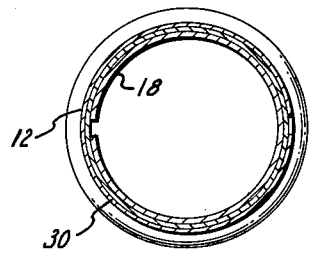
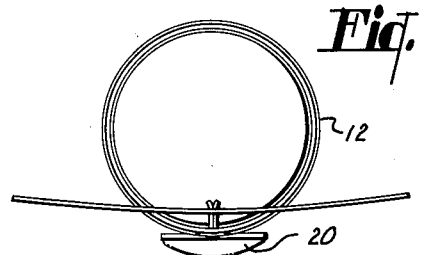
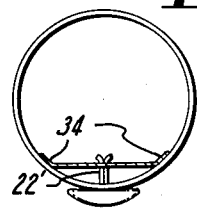
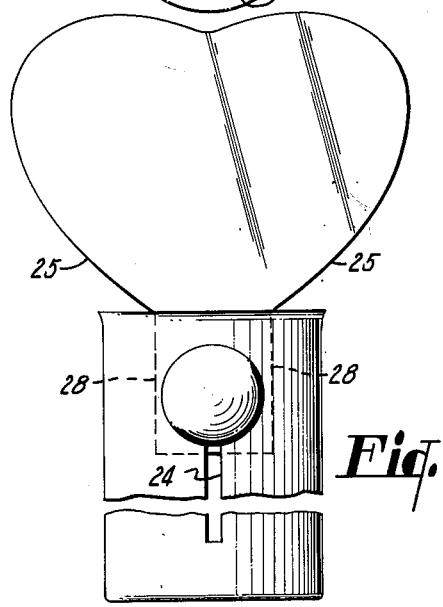
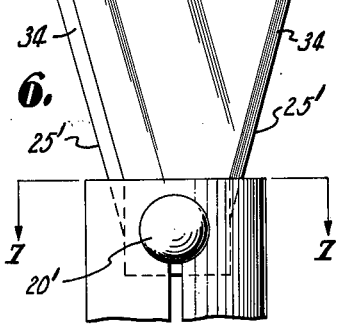
INVENTOR.
STANLEY S. ROMAN
BY Christie, Parker & Hale
ATTORNEYS

United States Patent Office 3,123,661
Patented Mar. 3, 1964

3,123,661
RETRACTABLE MIRROR FOR A LIPSTICK TUBE
Stanley S. Roman, 617 W. Norman Ave., Arcadia, Calif.
Original application Nov. 28, 1958, Ser. No. 776,787. Divided and this application Jan. 23, 1961, Ser. No. 84,459
4 Claims. (Cl. 88—96)

This invention relates generally to a flexible retractable mirror, and more particularly, is concerned with a flexible mirror that can be retracted into the cover of a lipstick tube. This is a division of my U.S. patent application Serial No. 776,787, filed November 28, 1958 (now abandoned).

Since it is necessary to use a mirror in properly applying lipstick, it has been proposed to attach a small mirror to a lipstick case for the convenience of the user. However, if the attached mirror is made large enough to be convenient to use, it renders the combination of mirror and lipstick case unattractively shaped and objectionably bulky.

Unlike in the ordinary compact, the flat shape of the mirror is incompatible with the normal cylindrical shape of the lipstick tube, making it difficult to combine the two in a pleasing and a practical way.

By the present invention, a mirror of substantial reflective surface area is combined with a lipstick tube, with the mirror normally being stored inside the cover for the tube. This is accomplished without materially altering the basic size or shape of the lipstick tube and cover. The present invention provides a lipstick case which is substantially the same as the ordinary tube of lipstick, and at the same time a mirror is provided of adequately large reflective area in combination with the lipstick case so as to be always conveniently available to the lipstick user.

In brief, the above features and advantages of the present invention are achieved by a retractable mirror device including a cap for a lipstick tube and a mirror made of thin spring material. In the preferred form of the invention, the mirror is substantially wedge-shaped in outline with two converging edges which engage the cap. The cap has the effect in cooperation with the wedging edge of the mirror to cause the mirror to fold into substantially cylindrical form as it is drawn inside the cap. In this manner, the width of the mirror can be made as large as the periphery of the cap, providing a substantial reflecting area.

For a more complete understanding of the invention, reference should be had to the accompanying drawings, wherein:

FIG. 1 shows an assembly view of a lipstick tube and cap, the cap being shown in section;

FIG. 2 is a partial sectional view taken substantially on the line 2—2 of FIG. 1;

FIG. 3 is a sectional view of the cap taken substantially on the line 3—3 of FIG. 1;

FIG. 4 is a partial elevational view showing the mirror extended;

FIG. 5 is a top view of the cap with the mirror extended;

FIG. 6 is an elevational view showing a modified mirror construction; and,

FIG. 7 is a sectional view taken substantially on the line 7—7 of FIG. 6.

Referring to the form of the invention as illustrated in FIGS. 1–5, the numeral 10 indicates generally a tube of lipstick having a cover or cap 12. At its open end, the cap 12 engages a shoulder portion 14 on the lipstick tube to hold it in closed position. The enlarged shoulder 14 provides an annular space 16 between the inside of the cap 12 and the lipstick tube.

A retractable mirror member 18, made of spring steel having a highly polished mirror surface, is arranged to be stored in the annular space 16 when retracted into the cap 12. When the cap 12 is removed from the lipstick tube, the mirror member 18 may be extended out of the open end of the cap into position in which it springs into its normally flat or planar condition as shown in FIGS. 4 and 5.

Retracting of the flexible mirror 18 into the cap 12 is accomplished by means of an external button 20. The external button has secured thereto a split tab 22 which projects through a longitudinal slot 24 in the cylindrical wall of the cap 12. The inner end of the tab 22 extends movably through a hole in the mirror member 18, the split ends of the tab 22 being spread after assembly so as to provide an enlargement at the interior end of the tab to hold the button 20 and mirror member 18 in assembled relationship.

The mirror member 18 is shaped in outline, as best seen in FIG. 4, with a substantially wedge-shaped configuration forming two converging edges as indicated at 25. A narrow end portion 26 is provided having a pair of parallel edges indicated at 28 which are spaced apart a distance substantially less than the inner diameter of the cap 12. The hole through which the tab 22 extends is provided in this narrow end region 26.

With the mirror extended as shown in FIGS. 4 and 5, the button 20 is moved to a first position at the end of the slot 24 adjacent the open end of the cap 12. The parallel edges 28 of the narrow end region 26 engage the inner surface of the cap 12.

Converging edges 25 of the mirror member 18 engage the edge formed by the open end of the cap 12, the open end being flared out slightly, as indicated. To retract the mirror member 18 within the cap 12, the button 20 is moved along the length of the slot 24. The force drawing the mirror member into the cap causes the mirror to deform through the wedging action produced between the converging edges 25 of the mirror member and the flared open end of the cap 12. Thus as the mirror member is drawn into the cap 12, it is formed into a cylindrical shape conforming to the inner wall of the cap 12.

A felt liner 30 is preferably provided on the inner surface of the cap 12 against which the mirrored surface of the mirror member 12 slides as it is moved into and out of the cap. This felt liner not only makes the mirror slide in and out more easily, but prevents scratching of the highly polished mirror surface of the mirror member 18. Also a nonmetallic spacer washer 32 may be provided between the button 20 and the outer surface of the cap 12 to prevent the knob from rubbing against the cap 12 and to make the button slide more easily along the slot 24.

As best shown in FIG. 3, with the mirror retracted, an ample opening is provided for the insertion of the tube 10. Thus the mirror takes full advantage of the annular space 16 for storage in the retracted position.

In the modification shown in FIGS. 6 and 7, the converging edges of the mirror 18', as indicated at 25', are made perfectly straight and are folded to form a lip, as indicated at 34. This lip provides stiffness to the mirror. At the same time, the lip edges provide a surface which engages the edge of the open end of the cap 12'. This results in smoother wedging action during retraction of the mirror. The construction is otherwise similar to that described in connection with FIGS. 1–4, including an external button 20' which extends through a slot in the cap 12' and is secured to the mirror by a split tab 22'.

From the above description it will be recognized that the present invention provides a compact lipstick tube and mirror combination. When not in use, the mirror can be retracted into a minimum space which conforms to the normal shape of the lipstick tube cap so as to take up no more space than an ordinary lipstick tube. At the same time, when extended, the mirror provides a substantial flat reflective area, making the mirror convenient to use in the application of the lipstick. Thus the advantages of compactness of size for convenient storage in purse or pocket coupled with the convenience of adequate mirror size for use in applying the lipstick are combined by the unique features of the present invention.

While the invention has been particularly described as applying to lipstick tubes, it will be appreciated that the invention is applicable to cosmetic containers in general as well as other applications where a retractable mirror is desired.

What is claimed is:

1. A retractable flat, image forming mirror device including a hollow container, a mirror member, and a retracting mechanism for protruding the mirror member from and retracting it to within the container, the mirror member being in the form of a thin mirrorer spring member that normally assumes a substantially flat condition when protruded from the container and which is of sufficient size relative to the interior of the container to be curved by the confining action of the container when retracted to within the container, the container being substantially cylindrical and having a slot extending longitudinally along one side thereof and an open end, the mirror member being adapted to protrude from the open end of the container and having a wedge-shaped outline with a wide end region and a narrow end region to provide two converging edges for engaging the open end of the container so as to facilitate curving of the mirror member when retracted to within the container, and the retracting mechanism including an external button and a tab element secured to the button, the tab element extending through the slot in the container and being secured to the narrow end region of the mirror member, whereby movement of the external button along said slot moves the mirror member into and out of the container through said open end thereof, the edges of the mirror member at the narrow end region being parallel and spaced less than the internal diameter of the container, and these parallel edges being held against the cylindrical interior surface of the container by the tab element with the narrow end of the member extending straight across the interior of the container as a chord to the cylindrical internal surface of the container with the mirror in its protruded position, whereby there is provided a stable support for the mirror member when it is fully extended from the container in its flattened condition.

2. A retractable mirror device according to claim 1 where the mirror member has a hole in its narrow end region, and the tab element extends movably through said hole and has an enlargement at its remote interior end, thus securing the tab element movably to the mirror member.

3. A retractable mirror device according to claim 1 wherein the container is flared outwardly at the open end thereof to provide a tapered surface engaging the converging edges of the mirror member.

4. A retractable mirror device according to claim 1 wherein the converging edges of the mirror member are straight and the mirror member is bent slightly along the straight edges to form wedging surfaces engaging the edge formed by the open end of the cap.

References Cited in the file of this patent

UNITED STATES PATENTS 2,662,968  Scaraber _____ Dec. 15, 1953